United States Patent [19]
Thomas et al.

[11] Patent Number: 5,897,435
[45] Date of Patent: *Apr. 27, 1999

[54] AIR VENT DEVICE

[76] Inventors: Allen C. Thomas, 16494 Offenhaur Dr., Odessa, Fla. 33556; Warren J. Chandler, 11910 Lake Wood Dr., Hudson, Fla. 34668

[ * ] Notice: This patent issued on a continued prosecution application filed under 37 CFR 1.53(d), and is subject to the twenty year patent term provisions of 35 U.S.C. 154(a)(2).

[21] Appl. No.: 08/755,464

[22] Filed: Nov. 22, 1996

[51] Int. Cl.⁶ ........................................... B60H 1/24
[52] U.S. Cl. ........................ 454/135; 454/128; 454/224
[58] Field of Search ................ 454/95, 128, 129, 454/130, 131, 135, 195, 196, 224

[56] References Cited

U.S. PATENT DOCUMENTS

| | | | |
|---|---|---|---|
| 1,353,301 | 9/1920 | Zaun | 454/195 X |
| 1,766,055 | 6/1930 | Clement et al. | 454/130 |
| 2,084,385 | 6/1937 | Conley et al. | 454/135 |
| 2,465,345 | 3/1949 | Elsebusch . | |
| 2,519,446 | 8/1950 | Elsebusch . | |
| 2,628,549 | 2/1953 | Stelmach . | |
| 2,780,458 | 2/1957 | Thaxton . | |
| 3,083,630 | 4/1963 | Thaxton . | |
| 4,346,648 | 8/1982 | Chatlos | 454/130 |
| 4,503,756 | 3/1985 | Chatlos | 454/130 |

FOREIGN PATENT DOCUMENTS

| | | | |
|---|---|---|---|
| 28 29 241 | 1/1980 | Germany | 454/131 |
| 431490 | 7/1935 | United Kingdom | 454/224 |

*Primary Examiner*—Harold Joyce
*Attorney, Agent, or Firm*—Frijouf, Rust & Pyle, P.A.

[57] ABSTRACT

An air vent device for a window comprising a first end section having a first end connector and a second end section having a second end connector. The second end section is a mirror image of the first end section. A central section has a plurality of louvered openings with a first end of the central section connecting with one of the first and second end connector. A second end of the central section has a central connector for connection with the other of the first and second end connector. The sections are affixed to the exterior surface of the structure to overlay a portion of the window for providing ventilation through the plurality of louvered openings for the structure when the window is partially opened and with the plurality of louvered openings providing protection from precipitation entering the structure through the partially opened window.

23 Claims, 8 Drawing Sheets

AIR VENT DEVICE

BACKGROUND OF THE INVENTION

FIELD OF THE INVENTION

This invention relates to ventilation of a structure and more particularly to an improved air vent device for a horizontally sliding window for providing ventilation for the structure and for providing protection from precipitation.

BACKGROUND OF THE INVENTION

Ventilation is the process of supplying or removing air by mechanical or natural means to a structure. This process is required for the removal of such impurities as products of human respiration and perspiration as well as gaseous products of combustion from stoves, combustion heaters and the like. Although carbon dioxide contents of 1% or more in the air are not harmful, substantially lower levels of carbon monoxide present significant health hazards to occupants of enclosed structures.

Natural ventilation is the result of wind action. A slight positive pressure is developed on the windward side of a structure relative to the pressure on the leeward side. Recreational and other vehicles contain air vent openings to facilitate the entry of fresh air into the vehicle. These openings are typically located on a top horizontal surface and on side vertical surfaces. Since the action of the wind is variable being dependent upon wind speed and direction as well as vehicle speed and direction relative to the wind, the control of the amount of air admitted to a structure or a vehicle presents a problem to those skilled in the art. Another problem associated with establishing and maintaining ventilation in a structure is the intrusion of precipitation by means of the air ventilation flow path.

Various solutions to these problems have been proposed by devices reported in the prior art.

U.S. Pat. No. 2,465,345 to Elsebusch discloses an antidraft device comprising a semi-cylindrical body with the semi-cylindrical body being adapted to be mounted vertically adjacent the rear edge and on the inner side of a window opening in a vehicle door. The semi-cylindrical body is provided with an integral top and an integral bottom, the body provided with an inner door-engaging edge and an outer longitudinally extending edge. The outer longitudinally extending edge is inwardly turned and overhangs a part of the window with the top and bottom each provided with an outer angular edge including an inner door-engaging portion and an outer portion. An integral attaching flange extends outwardly from the inner longitudinally extending door-engaging edge of the semi-cylindrical body. The attaching flange is in alignment with the inner door-engaging portions of the angular edges of the top and bottom and being adapted to be secured to the rear edge of the window opening with the outer portions of the angular edges extending inwardly at an angle from the inner door-engaging portions.

U.S. Pat. No. 2,519,446 to Elsebusch discloses an antidraft device having a vertical body of sheet material of a length sufficient to span the vertical dimension of a vehicle window the body having a pair of vertical edges. The body is curved in cross-section and having a main portion of relatively large radius and one edge portion of relatively small radius forming a continuous curve in one direction. A flange is of less vertical extent than the body whereby to fit between the sill and lintel of the window frame with the flange extending tangentially from the opposite vertical edge of the body, and having fastening means carried by the flange to engage the side of the window frame.

U.S. Pat. No. 2,628,549 to Stelmach discloses a ventilating and shielding device for mounting in the window opening of a vehicle window frame having a window glass comprising a main plate shaped to conform to the window opening and adapted to be positioned within the window frame in parallel spaced relation with respect to the window glass. A plurality of longitudinally extending slots are arranged in aligned parallel spaced relation in the plate with the slots extending inwardly from a point adjacent one end of the plate and terminating at a point spaced from the other end of the plate. A shutter plate is positioned in face to face relation with respect to the plate and connected to the main plate for vertical up and down movement. The shutter plate is provided with a plurality of longitudinally extending slots arranged in aligned parallel spaced relation with the slots of the shutter plate being registrable with the slots in the main plate upon a downward movement of the shutter plate. An upstanding louver is arranged at an angle with respect to the shutter plate adjacent each of the slots and having the lower end secured to the lower longitudinal side edge of the adjacent slot. A plurality of fasteners are arranged in spaced relation along the boundary of the main plate. Each fastener has means on one end embracingly engaging the adjacent portion of the window frame and having means on the other end bearing against the facing face of the main plate.

U.S. Pat. No. 2,780,458 to Thaxton discloses a window opening and a window slidable in the guides with a mechanism for moving the window in the guides comprising a pair of plates fixed together in spaced relation. The pair of plates are secured between the panels in substantially parallel relation therewith below and to one side of the window opening. The plate adjacent to the outer panel has an opening remote from the guides and an offset portion overlying the opening on the side opposite from the other plate. The offset portion carries a bearing with a stub shaft having one end in the bearing and extending through and rotatably supported by the other plate. A second shaft has an end rotatably supported by the second plate and extending through the inner panel. A pinion gear is carried by the stub shaft on the inner side of the offset with sprocket gears carried by the shafts between the other plate and the inner panel. A sector gear is disposed against the side of the first plate nearest the outer panel and having toothed connection with the pinion gear with means pivotally mounting the sector gear on the first plate for turning on an axis adjacent to and paralleling the second shaft. A pair of parallel bars are arranged with one of the bars having an end fixed to the sector gear and the other bar having an end pivotally secured to the one plate to turn on an axis paralleling the turning axis of the sector gear.

U.S. Pat. No. 3,083,630 to Thaxton discloses a ventilator unit for installation in a window opening having a vertically movable window panel therein and having window frame grooves. The unit comprises a pair of panels with hinge means coupling the panels together along two vertical edges. Each panel has a series of vertically spaced transversely extending elongate openings therein with each panel having a portion of the material thereof extending outwardly and downwardly from and along the top of each opening and forming a louver board over the opening. A sealing strip extends along the top and outer side edge of each panel and comprises a band portion having an edge slot in which the panel edge is seated and a transversely circular bead portion are engageable in the window frame grooves of a diameter greater than the thickness of the band portion. A seating strip extends along the bottom edge of each panel and comprises a band portion having an edge slot in which the panel edge is secured with a downwardly opening V-cross section portion for receiving the top edge of the window panel.

Although some success has been attained by these devices, some are overly complex leading to mechanical failure and resulting in relatively short useful life in an outdoor environment. Many of the air vent devices are designed to fit only a single size window. Other devices in the prior art attempt to solve these problems with limited success, but none has been able to satisfactorily address all of the problems associated with the ventilation problem.

Therefore, it is an object of the present invention to provide an improved air vent device for a window disposed in a vertically disposed surface of a structure.

Another object of this invention is to provide an improved air vent device for a window disposed in a vertically disposed surface of a structure comprising a plurality of louvered openings for inhibiting the entry of precipitation into the ventilated space.

Another object of this invention is to provide an improved air vent device for a window disposed in a vertically disposed surface of a structure which may be fitted to windows with a variety of differing heights.

Another object of this invention is to provide an improved air vent device for a window disposed in a vertically disposed surface of a structure which may be fitted to windows with a variety of differing heights by simple mechanical trimming.

Another object of this invention is to provide an improved air vent device for a window disposed in a vertically disposed surface of a structure located on either the left or right side of the building structure.

Another object of this invention is to provide an improved air vent device for a window disposed in a vertically disposed surface of a structure which is economical to purchase and install on the structure.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved air vent device for a window disposed in a vertically disposed exterior surface of a structure comprising a first end section having a first end connector and a second end section having a second end connector. The second end section is a mirror image of the first end section. A central section extends between a first end and a second end with a plurality of louvered openings disposed therebetween. The first end of the central section connects with one of the first and second end connector. The second end of the central section has a central connector for connection with the other of the first and second end connector. The first end section, the central section and the second end section are affixed to the exterior surface of the structure to overlay a portion of the horizontally sliding windows for providing ventilation through the plurality of louvered openings for the structure when the horizontally sliding window is partially opened and with the plurality of louvered openings providing protection from precipitation entering the structure through the partially opened horizontally sliding window.

In a more specific embodiment of the invention, each of the first and second end section comprises a unitary member. The central section is trimable by mechanically severing the first end of the central section for changing a distance between the first and second ends of the central section for accommodating for a vertical height of the window.

Preferably, each of the plurality of louvered openings of the central section is angularly disposed for inhibiting the entry of precipitation into each of the plurality of louvered openings when the first end is located vertically above the second end of the central section. Fastening means fastens the first and second end sections to the first and second ends of the central section. Preferably, the fastening means comprises mechanical fasteners for fastening the first and second end sections to the first and second ends of the central section. The first end of the central section connects with one of the first and second end connector providing a seal therebetween. The central connector of the second end of the central section connects with the other of the first and second end connector providing a seal therebetween.

In one embodiment of the invention, the improved air vent device comprises the first end section having a first end flange and the second end section having a second end flange. The second end section is a mirror image of the first end section. A central section extends between a first end and a second end with a plurality of louvered openings disposed therebetween. The first end of the central section is receivable within one of the first end flange and the second end flange. The second end of the central section has a central flange for receiving the other of the first end flange and the second end flange within the central flange. The first end section, the central section and the second end section are affixed to the exterior surface of the structure to overlay a portion of the window for providing ventilation through the plurality of louvered openings for the structure when the window is partially opened and with the plurality of louvered openings providing protection from precipitation entering the structure through the window.

In a more specific embodiment of the invention, the first end of the central section is receivable within and overlapped by one of the first and second end flanges for creating a seal therebetween. The second end of the central section has a central flange for receiving and overlapping the other of the first and second end flanges for creating a seal therebetween.

The first end section is located vertically above the second end section on a left side of the structure being interchangeable with the second end section being located vertically above the first end section on a right side of the structure. The second end section is located vertically below the first end section on a left side of the structure being interchangeable with the first end section being located vertically below the second end section on a right side of the structure. The center section is interchangeable between the left side of the structure and the right side of the structure with the first end of the center section being disposed above the second end of the center section.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
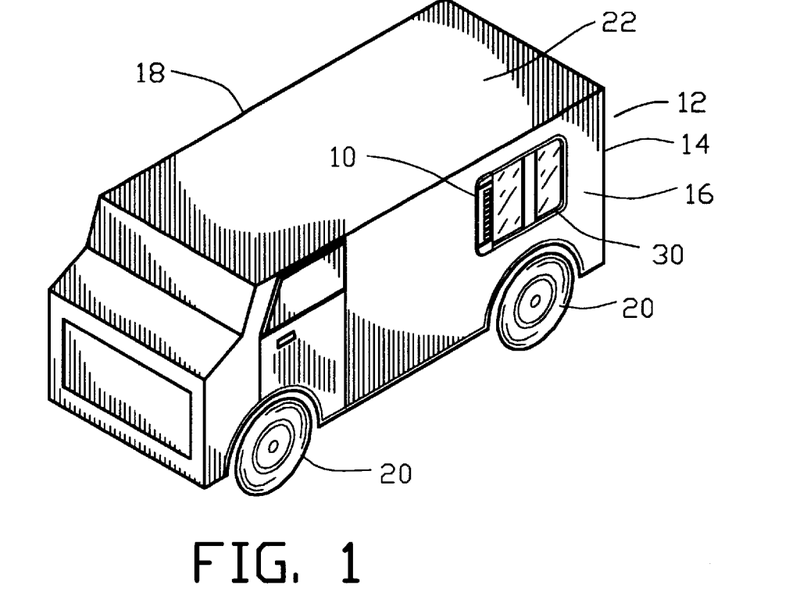
FIG. 1 is an isometric view of the improved air vent device for a horizontally sliding window located in a vertically disposed, left exterior surface of a structure.

FIG. 1 is an isometric view of an improved air vent device 10, vertically disposed on the left exterior surface 2 of a structure 12. The structure 12 comprises a vehicle 14 having a left exterior surface 16, a right exterior surface 18, a wheel/tire assembly 20, and a substantially horizontal roof surface 22. A horizontally sliding window 30 is disposed on the left exterior surface 16 of the structure 12 with a similar window (not shown) being disposed on the right exterior surface 18 of the structure 12.

Figure 2:
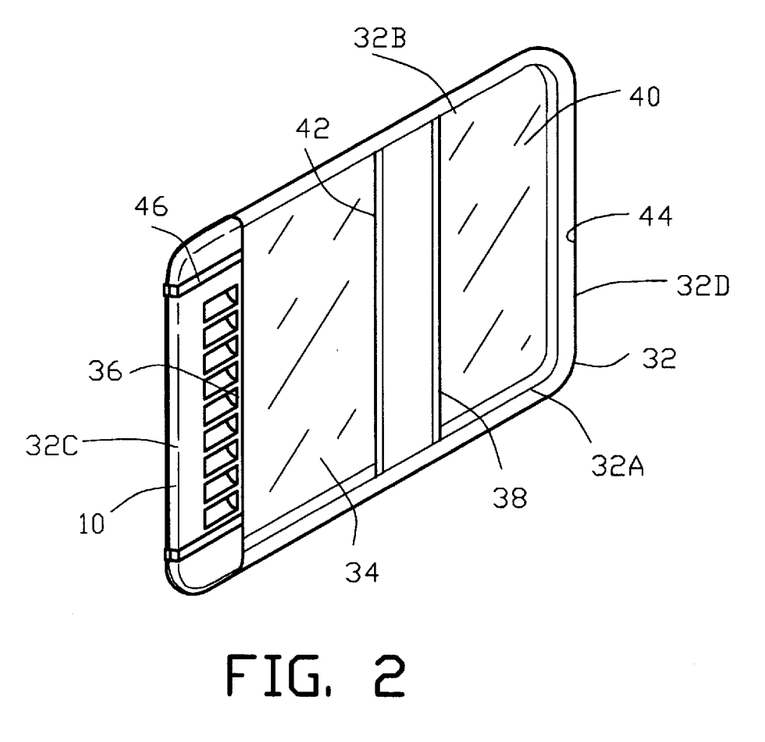
FIG. 2 is an enlarged view of the improved air vent device on the horizontally sliding window of FIG. 1.

FIG. 2 is an enlarged view of the improved air vent device 10 of FIG. 1 mounted on the vertically disposed left exterior surface 16 of a structure 12. The horizontally sliding window 30 comprises a window frame 32 having a lower frame portion 32A, an upper frame portion 32B, a left frame portion 32C and a right frame portion 32D. The horizontally sliding window 30 comprises a forward sliding window 34 having a forward edge 36 and a rear edge 38, and a rear window 40 which may be slidable having a forward edge 42 and a rear edge 44. Forward sliding window 34 is illustrated in a slidably adjustable partially open position wherein the forward edge 36 of forward sliding window 34 is illustrated disposed from left frame portion 32C of the window frame 32 and rear edge 38 of forward sliding window 34 is shown overlapping the forward edge 42 of rear window 40. The open position of the forward sliding window 34 provides an adjustable ventilation path 46 between improved air vent device 10 and the interior of the structure 12.

Figure 3:
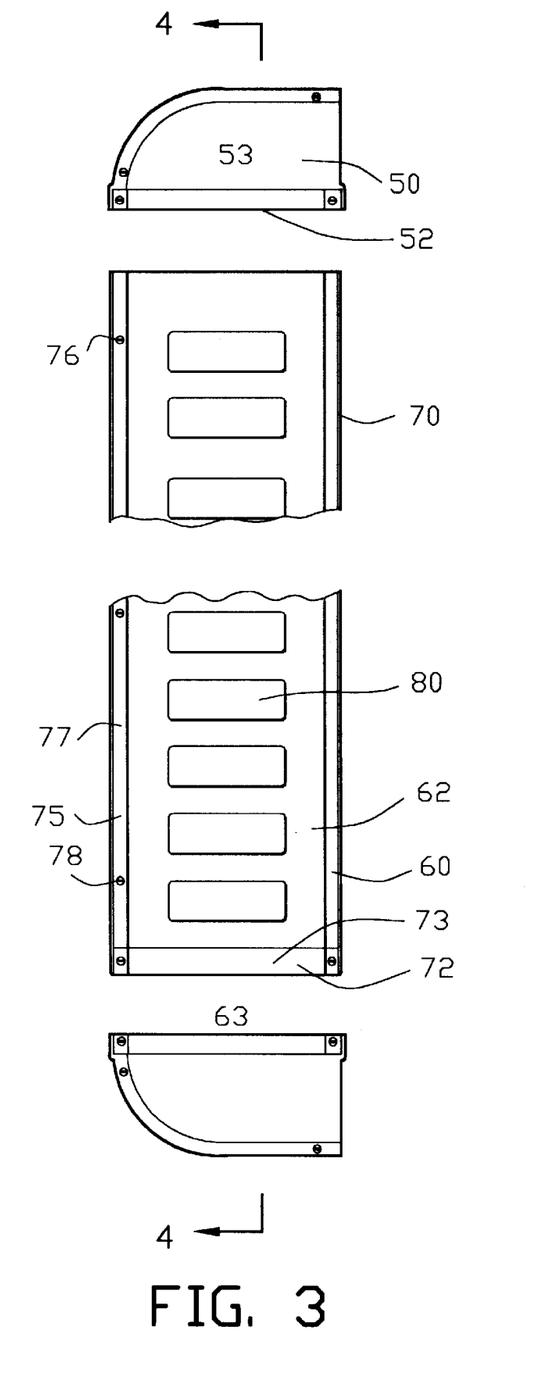
FIG. 3 is an exploded view of the improved air vent device of FIG. 2 disposed adjacent to the left exterior surface of the structure.

FIG. 3 is an exploded view of the improved air vent device 10 comprising a first end section 50, a second end section 60 and a central section 70. The first end section 50 comprises a first end connector shown as a first connector flange 52 provided with flange holes 53. The first end section 50 includes a first mounting rib 54 provided with rib holes 55. The first rib 54 is arcuate in shape for receiving in the curved corners of the window frame 32.

Figure 4:
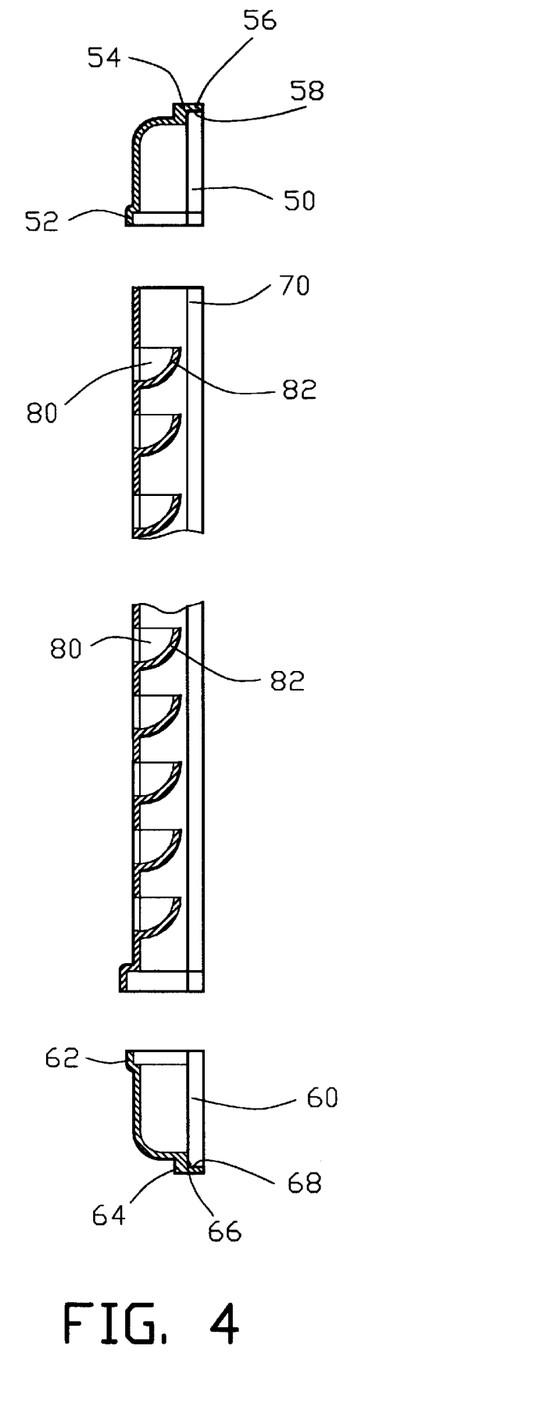
FIG. 4 is a sectional view along line 4—4 in FIG. 3.

FIG. 4 is a sectional view along line 4—4 in FIG. 3 illustrating the first rib 54 comprising an engaging surface 56 for engaging with the window frame 32 and an adjacent surface 58 for encompassing the window frame 32. The engaging surface 56 and the adjacent surface 58 assist in positioning the first end section 50 relative to the window frame 32.

The second end section 60 comprises a second end connector shown as a second connector flange 62 provided with flange holes 63. The second end section 60 includes a second mounting rib 64 provided with rib holes 65. The second rib 64 is arcuate in shape for receiving in the curved corners of the window frame 32.

As shown in FIG. 4, the second rib 64 comprises an engaging surface 66 for engaging with the window frame 32 and an adjacent surface 68 for encompassing the window frame 32. The engaging surface 66 and the adjacent surface 68 assist in positioning the second end section 60 relative to the window frame 32. The second end section 60 is a mirror image of the first end section 50.

The central section 70 extends between a first end and a second end 71 and 72. The first end 71 of the central section 70 is adapted to be connected with one of the first and second end connectors or flanges 52 and 62. The second end 72 of the central section 70 has a central connector or central flange 73 provided with flange holes 74 for connection with the other of the first and second end connectors or flanges 52 and 62.

The central section 70 includes a central mounting rib 75 provided with rib holes 76. The central mounting rib 75 is linear in shape for receiving in the linear portion of the window frame 32. The central mounting rib 75 comprises an engaging surface 77 for engaging with the window frame 32 and an adjacent surface 78 for encompassing the window frame 32. The engaging surface 77 and the adjacent surface 78 assist in positioning the central section 70 relative to the window frame 32.

The central section 70 includes a plurality of louvered openings 80 disposed between the first and second ends 71 and 72. A plurality of louver fins 82 are located adjacent to each of the a plurality of louvered openings 80. Each of the plurality of louver fins 82 is angularly disposed for inhibiting the entry of precipitation into each of the plurality of louvered openings 80. As will be described in greater detail hereinafter, the plurality of louvered openings 80 provide ventilation for the structure 12 whereas the plurality of louver fins 82 provide protection from precipitation entering the structure 12 through the plurality of louvered openings 80.

Preferably, each of the first and second end sections is a unitary member molded from a polymeric material. In a similar manner, the central section comprises a unitary member molded from a polymeric material. As will be described in greater detail hereinafter, the first end 71 of the central section 70 is trimable by mechanically severing the first end 71 for accommodating for the vertical height of the window frame 32.

Figure 5:
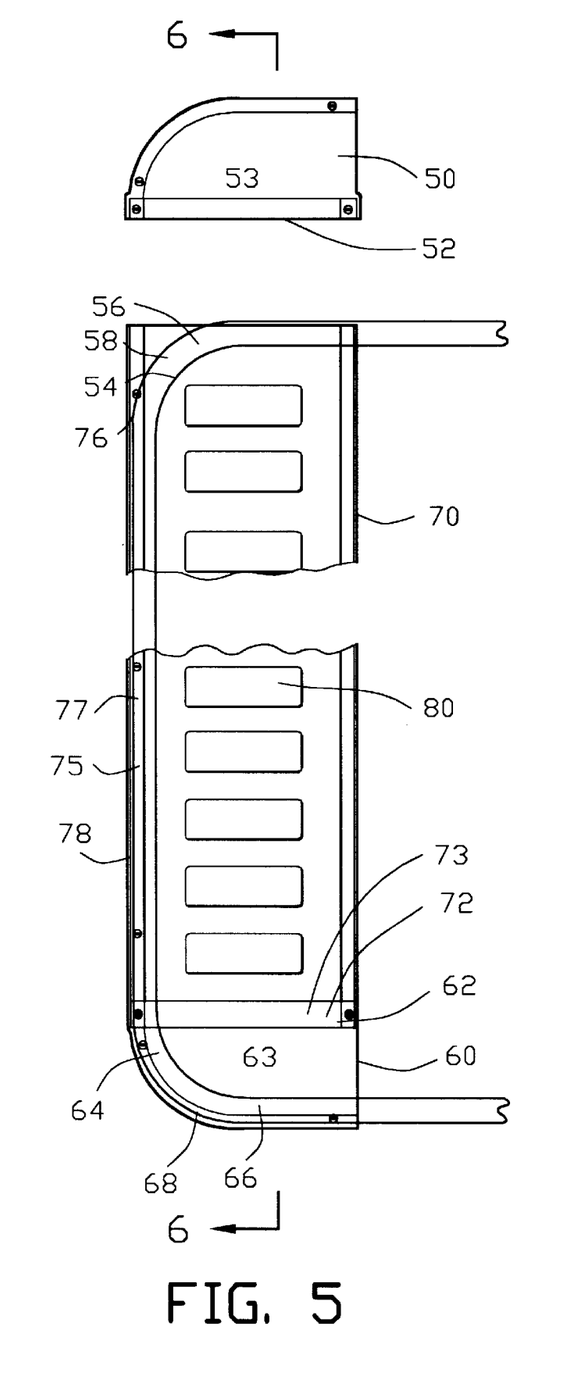
FIG. 5 is a view similar to FIG. 3 illustrating the positioning of a second end section and a central section over a window frame.
Figure 6:
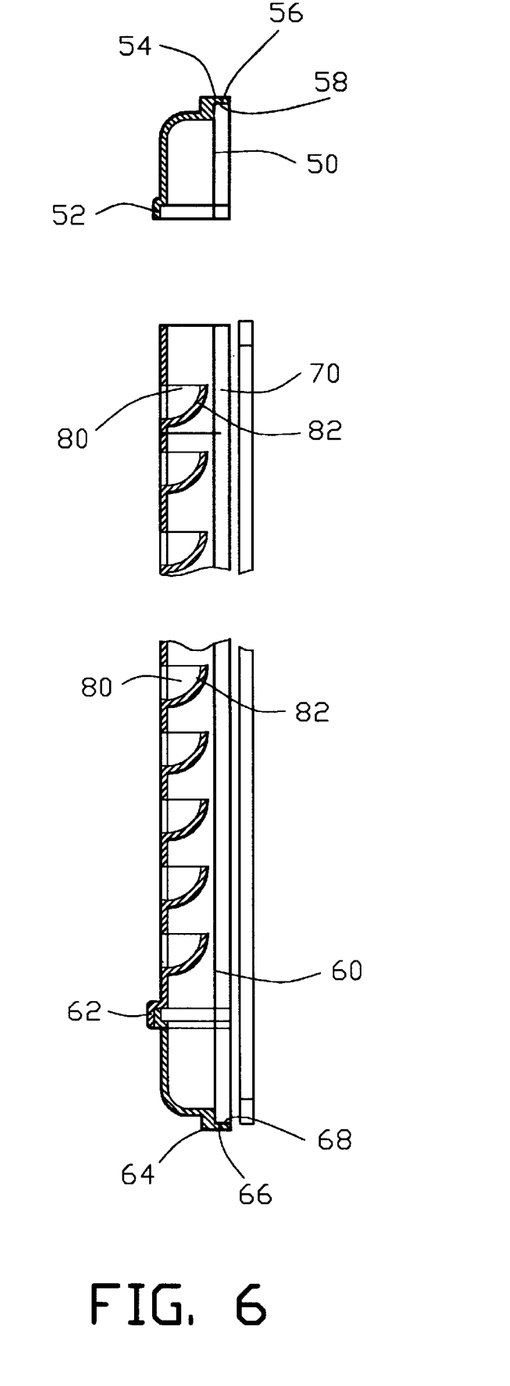
FIG. 6 is a sectional view along line 6—6 in FIG. 5.

FIG. 5 is a view similar to FIG. 3 illustrating the positioning of a second end section 60 and the central section 70 over the window frame 32 with FIG. 6 being a sectional view along line 6—6 in FIG. 5. As best shown in FIG. 6, the second end 72 of the central section 70 has a central flange 73 for receiving within and overlapping the second end flange 62 of the second end section 60. The flange holes 74 of the central connector 73 are aligned with the flange holes 63 of the second connector 62 of the second end section 60 for enabling mechanical fasteners 69 for affixing central section 70 to second end section 50. The overlap of the central connector flange 73 over the second end flange 62 allows water to pass over the seal formed between the central section 70 and the second end section 60.

Following the assembly of the second end section 60 to the central section 70, the second end section 60 and the central section 70 are positioned adjacent the lower and left frame portions 32A and 32C. The second rib 64 is arcuate in shape for receiving in the curved corners of the window frame 32. In addition, the engaging surface 66 and the adjacent surface 68 of the second end section 60 as well as the engaging surface 77 and the adjacent surface 78 of the central section 70 assist in positioning the second end section 60 and the central section 70 relative to the window frame 32. After the second end section 50 and the central section 70 are properly positioned relative to the window frame 32, the new first end 71 A of the central section 70 may be marked by with a trim line 84. In the alternative, the trim line 84 may be marked through the use of a preinstalled paper scale affixed to the central section 70.

Figure 7:
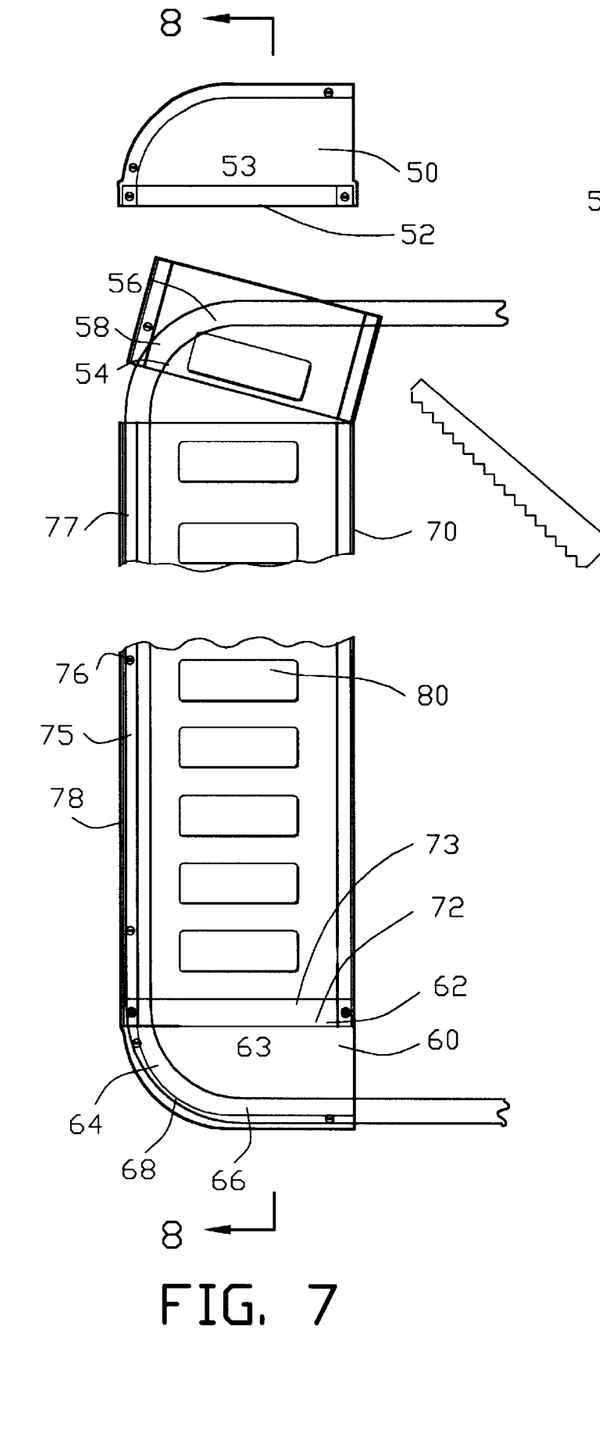
FIG. 7 is a view similar to FIG. 5 illustrating the trimming of the central section for accommodating for a vertical height of the horizontally sliding window.
Figure 8:
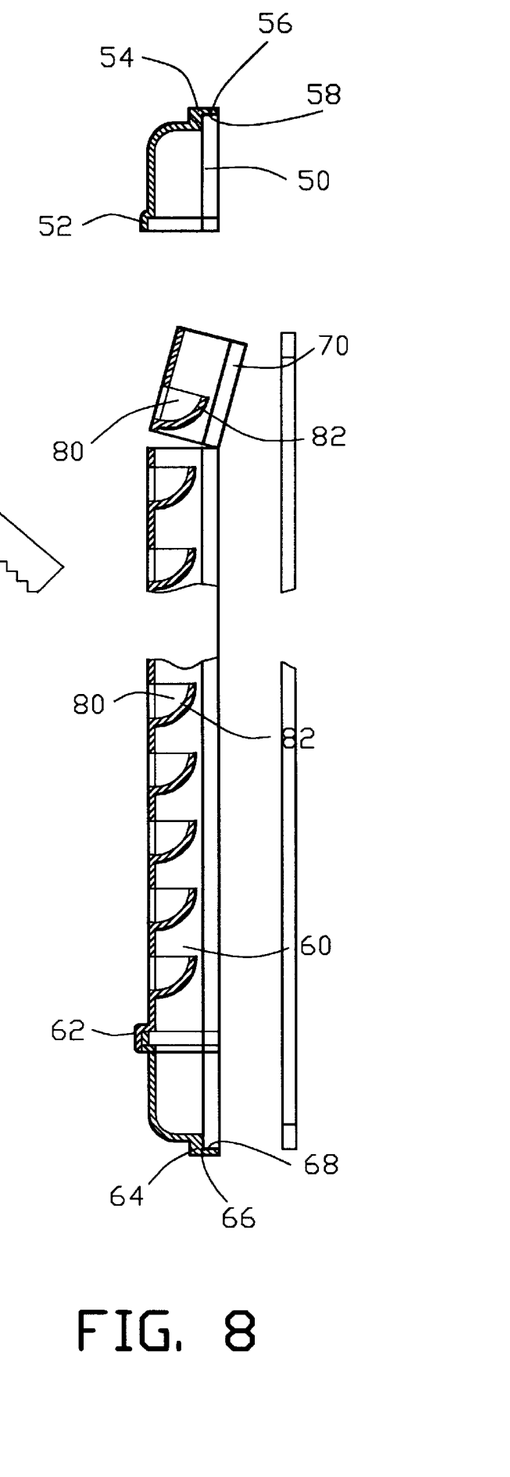
FIG. 8 is a sectional view along line 8—8 in FIG. 7.

FIG. 7 is a view similar to FIG. 5 illustrating the trimming of the central section 70 for accommodating for a vertical height of the window frame 32. FIG. 8 is a sectional view along line 8—8 in FIG. 7. The first end 71 of the central section 70 is trimable by mechanically severing the first end 71 to form a new first end 71A of the central section 70 for changing a distance between the first and second ends 71 and 72 for accommodating for a vertical height of the window frame 32. The trimming of the first end 71 may be accomplished by marking the new first end 71A of the central section 70 with a marker. Thereafter, the first end 71 may be trimmed by a common hack saw 86 or the like along the trimming line 84 substantially parallel and proximate to the first end 71 of the central section 70 to establish a new first end 71A of the central section 70.

Figure 9:
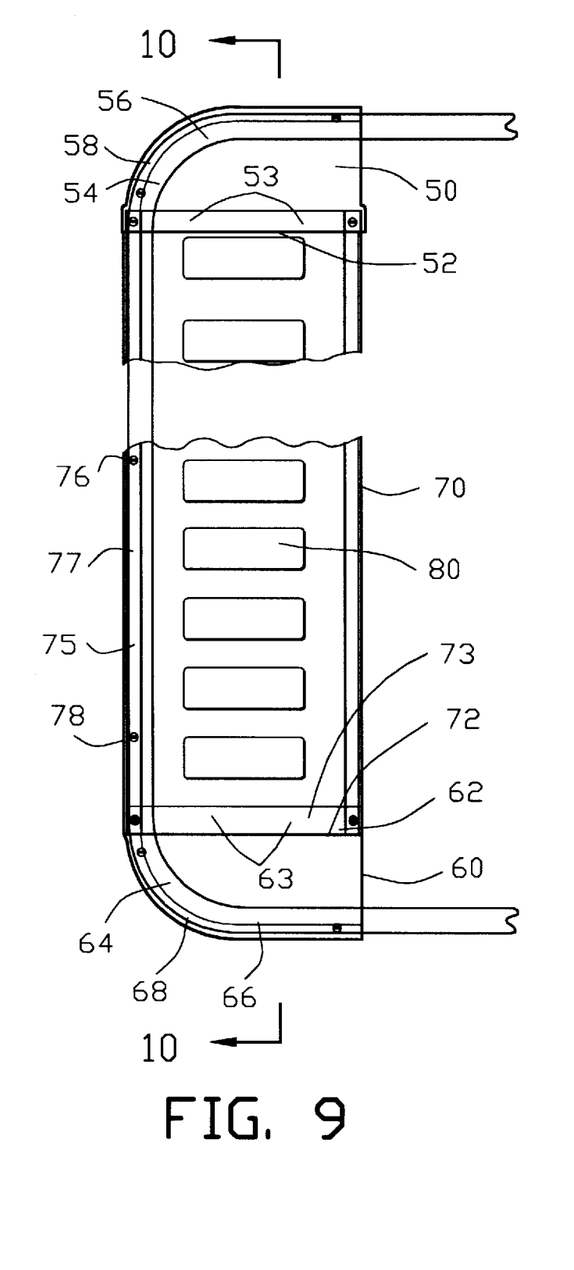
FIG. 9 is a view similar to FIG. 7 illustrating the securing of a first end section to the central section and the securing of the improved air vent device on the horizontally sliding window located on the left exterior surface of the structure.
Figure 10:
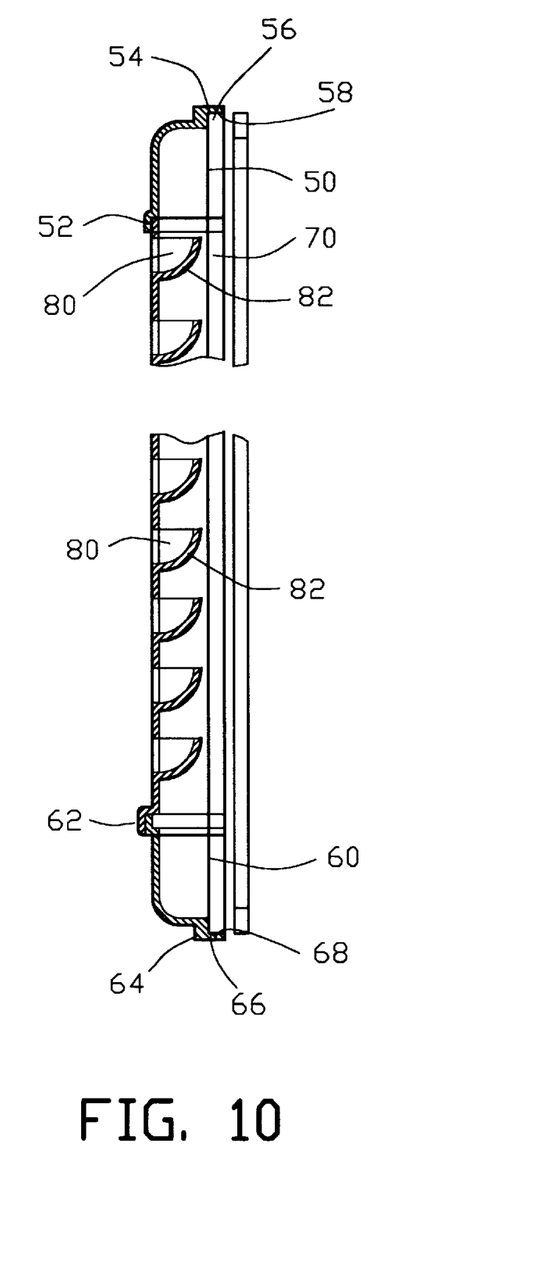
FIG. 10 is a sectional view along line 10—10 in FIG. 9.

FIG. 9 is a view similar to FIG. 7 illustrating the securing of the first end section 60 to the central section 70 and the securing of the improved air vent device 10 on the window frame 32 located on the left exterior surface 16 of the structure 12. FIG. 10 is a sectional view along line 10—10 in FIG. 9. The first end 71 of the central section is received within and overlapped by the first end flange 52 of the first end section 50. Additional connector holes 71B are drilled in the central section 70 following trimming of the first end 71 of the central section 70. The connector holes 71B of the first end 71 are aligned with the flange holes 53 of the first end section 50 for enabling mechanical fasteners 79 for affixing central section 70 to first end section 50. The overlap of the first end flange 62 over the first end 71 of the central section 70 allows water to pass over the seal formed between the first end section 50 and the central section 70.

Following the assembly of the first end section 50 to the central section 70, the first end section 50, the second end section 60 and the central section 70 are positioned adjacent the window frame 32. The engaging surface 56 and the adjacent surface 58 of the first end section 50 and the engaging surface 66 and the adjacent surface 68 of the first end section 50 as well as the engaging surface 77 and the adjacent surface 78 of the central section 70 assist in positioning the improved air vent device 10 relative to the window frame 32. After the improved air vent device 10 is positioned relative to the window frame 32, the improved air vent device 10 is affixed to the structure 12 using mechanical fasteners 89 such as screws disposed through the rib holes 55, 65 and 76 of the first and second end sections 50 and 60 and the central section 70.

The first end section 50, the central section 70 and the second end section 60 is affixed to the left exterior surface 16 of the structure 12 to overlay a portion of the open portion of the forward sliding window 34. The improved air vent device 10 provides ventilation through the plurality of louvered openings 80 for the structure 12 when the window 34 is partially opened. The plurality of louvered fins 82 provides protection from precipitation entering the structure through the partially opened window 34. Since the plurality of louvered openings 80 are located on the side of the improved air vent device 10, air may be drawn in or discharged from the plurality of louvered openings 80 as the vehicle 14 is moved in a forward direction.

Figure 11:
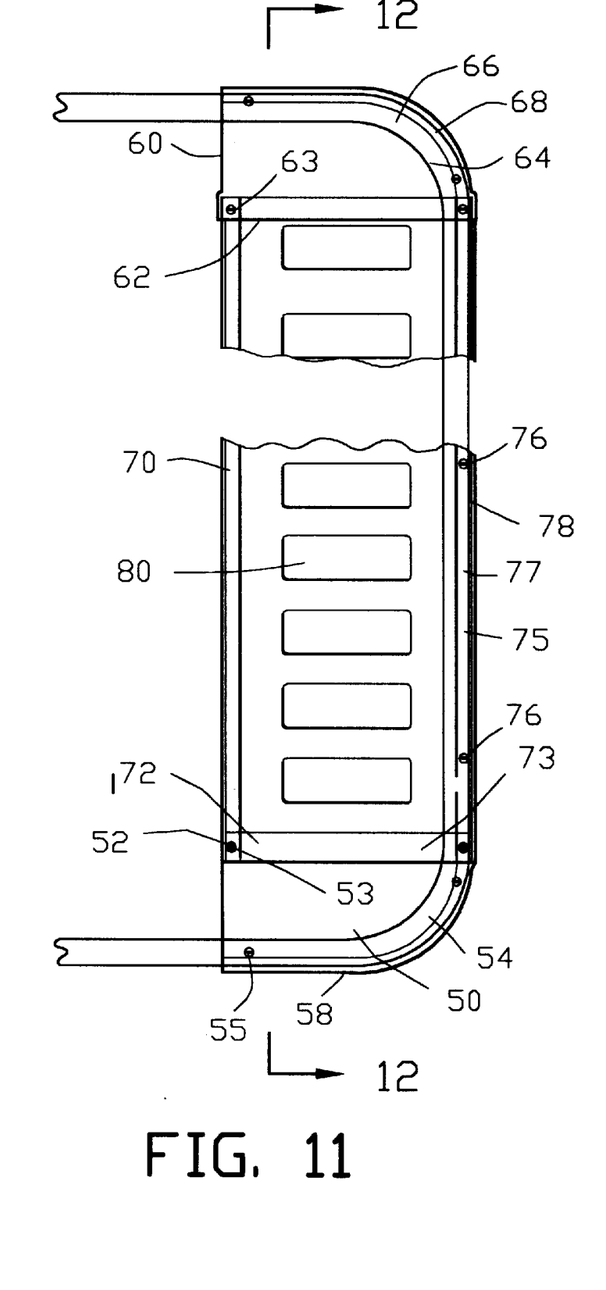
FIG. 11 is a view illustrating the first and second end sections and the central section of the improved air vent device secured on the horizontally sliding window located on a right exterior surface of the structure.
Figure 12:
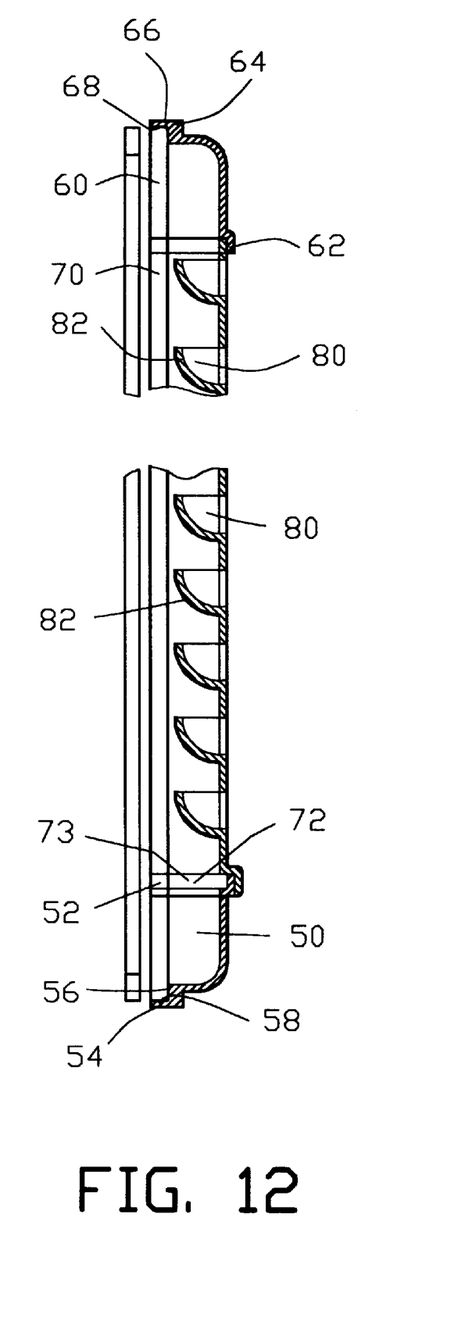
FIG. 12 is a sectional view along line 11—11 in FIG. 12.

FIG. 11 is a view illustrating the first and second end sections 50 and 60 and the central section 70 of the improved air vent device 10 secured on the horizontally sliding window (not shown) located on a right exterior surface 18 of the structure 12. FIG. 12 is a sectional view along line 11—11 in FIG. 12. The first end section 50 is located vertically above the second end section 60 on a left side 16 of the structure 12. However, the second end section 60 is located vertically above the first end section 50 on a right side 18 of the structure 12. Conversely, the second end section 60 is located vertically below the first end section 50 on a left side 16 of the structure 12 while the first end section 50 is located vertically below the second end section 60 on the right side 18 of the structure 12. The center section 70 is interchangeable between the left side 16 of the structure 12 and the right side 1 8 of the structure 12 with the first end 71 of the center section 70 being disposed above the second end 72 of the center section 70. Accordingly, the first and second end sections 50 and 60 being mirror images of each other enables the relative positions of the first and second end sections 50 and 60 to be interchanged between the left side 16 of the structure 12 and the right side 18 of the structure 12.

Figure 13:
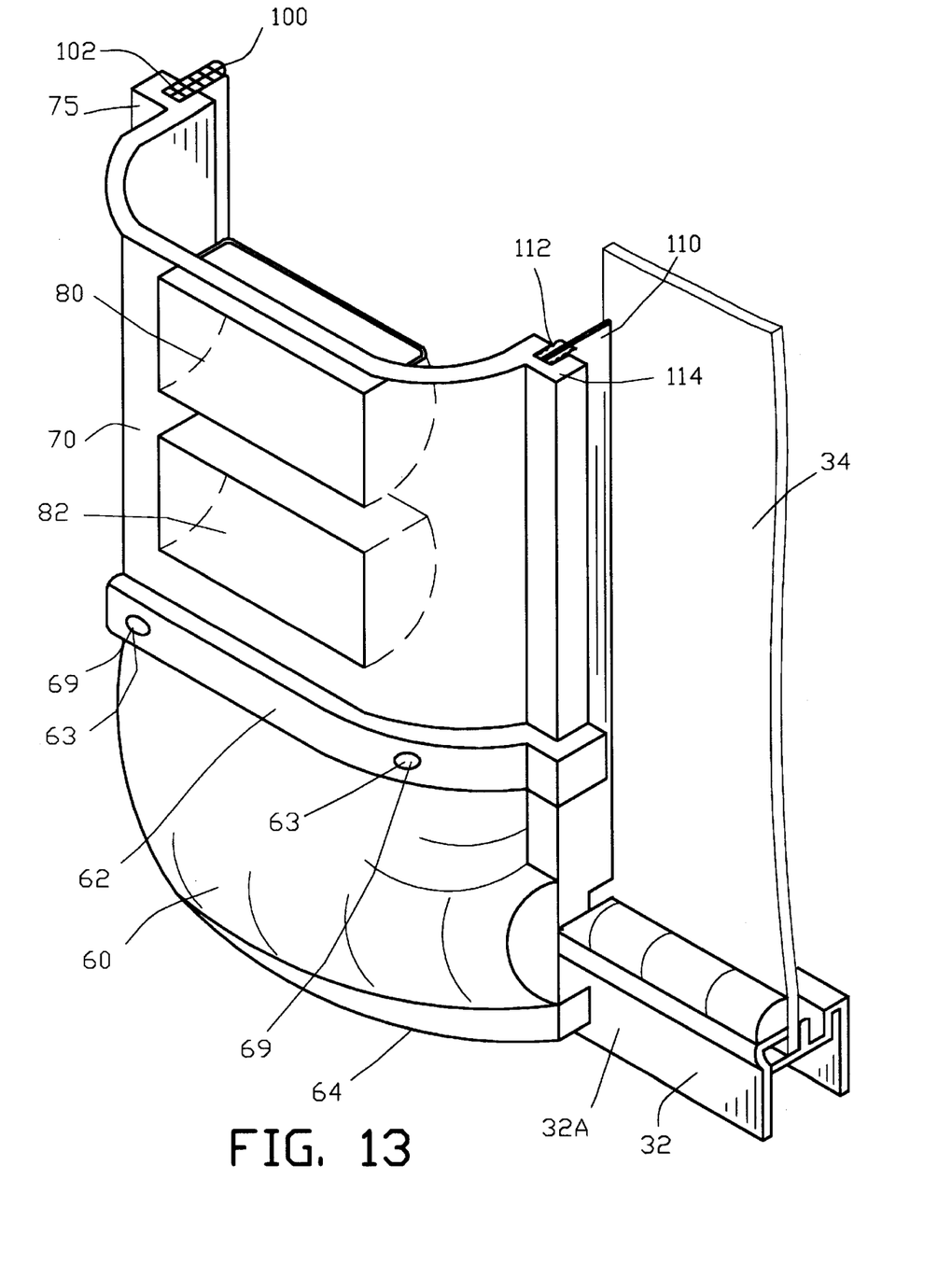
FIG. 13 is an enlarged isometric view of a portion of the improved air vent device of FIG. 2 illustrating a first sealing means for providing a seal with the exterior surface of the structure and a second sealing means for providing a seal with the sliding window.

FIG. 13 is an enlarged isometric view of a portion of the improved air vent device 10 of FIG. 2 illustrating a first sealing means 100 for providing a seal with the exterior surface 16 of the structure 12 and a second sealing means 110 for providing a seal with the sliding window 34. The first sealing means 100 is disposed in first end section seal groove (not shown), a central section mounting seal groove 102, and second end section mounting seal groove (not shown) to provide a seal between the left exterior surface 16 of the structure 12 and the improved air vent device 10. The second sealing means 110 is disposed in first end section sliding window seal groove (not shown), a central section sliding window seal groove 112 defined in a boss 114, and second end section sliding window seal groove (not shown) to provide a seal between the horizontally sliding window 34 and the improved air vent device 10.

Figure 14:
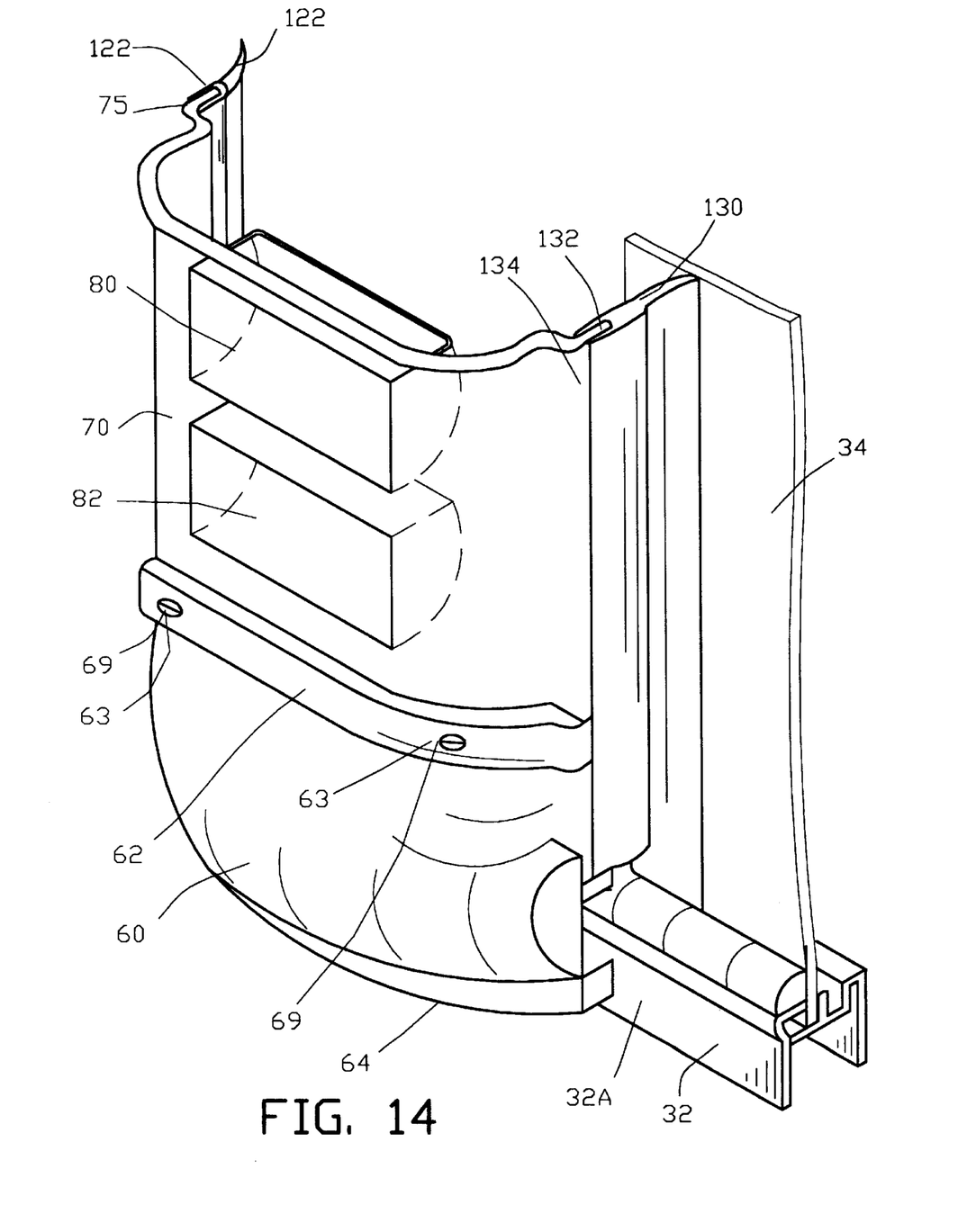
FIG. 14 is an enlarged isometric view of a portion of the improved air vent device of FIG. 2 illustrating an alternative first sealing means for providing a seal with the exterior surface of the structure and an alternative second sealing means for providing a seal with the sliding window.

FIG. 14 is an enlarged isometric view of a portion of the improved air vent device 10 of FIG. 2 illustrating an alternative first sealing means 120 for providing a seal with the exterior surface 16 of the structure 12 and an alternative second sealing means 130 for providing a seal with the sliding window 34. The first sealing means 120 is disposed in the encompassing surfaces 58, 68 and 78 of the first end section 50, the central section 70, and the second end section 60 to provide a seal between the left exterior surface 16 of the structure 12 and the improved air vent device 10. The second sealing means 130 is disposed on a boss 134 to provide a seal between the horizontally sliding window 34 and the improved air vent device 10.

Exterior air enters the improved air vent device 10 through the plurality of louvered openings 80 in central section 70 and is directed upward by the plurality of louver fins 82, thereby allowing ventilating air to enter the interior of structure 12. The plurality of louver fins 82 prevent the admission of precipitation. Forward edge 36 of forward sliding window 34 is illustrated disposed in a partially open position for allowing the admission of exterior ventilating air. Slidable adjustment of the forward sliding window 34 from a fully closed position (not shown) to an open position, as illustrated, permits variable control of ventilation from total exclusion of ventilation to ventilation at maximum velocity, dependent upon operating environmental conditions.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An air vent device for a sliding window located in a vertically disposed exterior surface of a structure, comprising;

a first end section having a first end connector;

a second end section having a second end connector;

said second end section being a mirror image of said first end section;

a central section extending between a first end and a second end with a plurality of louvered openings disposed therebetween;

said first end of said central section connecting with one of said first and second end connector;

said second end of said central section having a central connector for connection with the other of said first and second end connector;

mounting means including a first mounting means for securing the first end section to the exterior surface of the structure on a first side of the sliding window and a second mounting means for securing the second end section to the exterior surface of the structure on a second side of the sliding window to overlay a portion of the sliding window for enabling the sliding window to be slidably moved between a closed position and all open position; and said plurality of louvered openings providing ventilation through said plurality of louvered openings for the structure when the sliding window is moved into a partially opened position and with said plurality of louvered openings providing protection from precipitation entering the structure through the partially opened sliding window.

2. An air vent device as set forth in claim 1, wherein the window is a horizontally sliding window.

3. An air vent device as set forth in claim 1, wherein each of said first and second end section comprises a unitary member.

4. An air vent device as set forth in claim 1, wherein said central section comprises a unitary member; and said first end of said central section being trimable by mechanically severing said first end of said central section for changing a distance between said first and second ends for accommodating for a vertical height of the window.

5. An air vent device as set forth in claim 1, wherein each of said plurality of louvered openings of said central section is angularly disposed for inhibiting the entry of precipitation into each of said plurality of louvered openings when said first end is located vertically above said second end of said central section.

6. An air vent device as set forth in claim 1, including fastening means for fastening said first and second end sections to said first and second ends of said central section.

7. An air vent device as set forth in claim 1, including fastening means for fastening said first and second end sections to said first and second ends of said central section; and said fastening means comprising mechanical fasteners for fastening said first and second end sections to said first and second ends of said central section.

8. An air vent device as set forth in claim 1, wherein said first end of said central section connecting with one of said first and second end connector providing a seal therebetween; and said central connector of said second end of said central section connecting with the other of said first and second end connector providing a seal therebetween.

9. An air vent device as set forth in claim 1, wherein said first end section is located vertically above said second end section on a left side of the structure being interchangeable with said second end section being located vertically above said first end section on a right side of the structure;

said second end section being located vertically below said first end section on a left side of the structure being interchangeable with said first end section being located vertically below said second end section on a right side of the structure; and said center section being interchangeable between said left side of the structure and the right side of the structure with said first end of said center section being disposed above said second end of said center section.

10. An air vent device as set forth in claim 1, wherein said mounting means for affixing said first end section, said central section and said second end section to the exterior surface of the structure includes mechanical fastening means.

11. An air vent device as set forth in claim 1, including first sealing means for providing a seal between said first end section, said central section and said second end section with the exterior surface of the structure.

12. An air vent device as set forth in claim 1, including second sealing means for providing a seal between said first end section, said central section and said second end section with the partially opened window.

13. An air vent device as set forth in claim 1, including a second sealing means for providing a wiping seal between said first end section, said central section and said second end section with the window for permitting slidable adjustment of the window.

14. An air vent device for a horizontally sliding window disposed in a vertically disposed exterior surface of a structure, comprising;

a first end section having a first end flange;

a second end section having a second end flange;

said second end section being a mirror image of said first end section;

a central section extending between a first end and a second end with a plurality of louvered openings disposed therebetween;

said first end of said central section being receivable within one of said first end flange and said second end flange;

said second end of said central section having a central flange for receiving the other of said first end flange and said second end flange within said central flange;

mounting means for affixing said first end section, said central section and said second end section to the exterior surface of the structure to overlay a portion of the horizontally sliding windows for providing ventilation through said plurality of louvered openings for the structure when the horizontally sliding window is partially opened and with said plurality of louvered openings providing protection from precipitation entering the structure through the horizontally sliding window.

15. An air vent device as set forth in claim 14, wherein said first end of said central section is trimable by mechanically severing said first end of said central section for changing a distance between said first and second ends for accommodating for a vertical height of the horizontally sliding window.

16. An air vent device as set forth in claim 14, wherein each of said plurality of louvered openings of said central section is angularly disposed for inhibiting the entry of precipitation into each of said plurality of louvered openings when said first end is located vertically above said second end of said central section.

17. An air vent device as set forth in claim 14, including fastening means for fastening said first and second end sections to said first and second ends of said central section.

18. An air vent device as set forth in claim 14, including fastening means for fastening said first and second end sections to said first and second ends of said central section; and said fastening means comprising mechanical fasteners for fastening said first and second end sections to said first and second ends of said central section.

19. An air vent device as set forth in claim 14, wherein said first end of said central section is receivable within and being overlapped by one of said first end flange and said second end flange for creating a seal therebetween; and said second end of said central section having a central flange for receiving within and overlapping the other of said first end flange and said second end flange for creating a seal therebetween.

20. An air vent device as set forth in claim 14, wherein said first end section is located vertically above said second end section on a left side of the structure being interchangeable with said second end section being located vertically above said first end section on a right side of the structure;

said second end section being located vertically below said first end section on a left side of the structure being interchangeable with said first end section being located vertically below said second end section on a right side of the structure; and said center section being interchangeable between said left side of the structure and the right side of the structure with said first end of said center section being disposed above said second end of said center section.

21. An improved air vent device as set forth in claim 14, including first sealing means for providing a seal between said first end section, said central section and said second end section with the exterior surface of the structure.

22. An air vent device as set forth in claim 14, including second sealing means for providing a seal between said first end section, said central section and said second end section with the partially opened horizontally sliding window.

23. An air vent device as set forth in claim 14, including a second sealing means for providing a wiping seal between said first end section, said central section and said second end section with the horizontally sliding window for permitting slidable adjustment of the horizontally sliding window.

* * * * *